June 14, 1932. H. E. NORVIEL Re. 18,497

IGNITION COIL AND LOCK SWITCH

Original Filed Aug. 21, 1926

Inventor

Harry E. Norviel,
deceased

By Spencer Hardman & Fehr

Attorneys

Reissued June 14, 1932

Re. 18,497

UNITED STATES PATENT OFFICE

HARRY E. NORVIEL, DECEASED, LATE OF ANDERSON, INDIANA, BY DELCO-REMY CORPORATION, OF ANDERSON, INDIANA, ASSIGNEE

IGNITION COIL AND LOCK SWITCH

Original application filed August 21, 1926, Serial No. 130,615. Divided and application filed April 12, 1927. Serial No. 183,144. Renewed October 2, 1929. Patent No. 1,759,462, dated aMy 20, 1930. Application for reissue filed April 12, 1932. Serial No. 604,841.

This invention relates to controls and locks therefor, and particularly to apparatus for preventing the unauthorized use or theft of an automobile.

This application is a division of my copending application, Serial No. 130,615, filed August 21, 1926.

One of the objects of the present invention is to provide a controller which may be unlocked by the use of a key, but movement of the controller to operating position is prevented so long as the key remains in the lock. Preferably, the controller includes means for automatically moving the operating member of the controller to operating position when the key is withdrawn from the lock.

The invention is susceptible of many applications, and, when applied to an electric switch, the objects of the invention are accomplished by providing an electric switch with means such as a spring tending to move the movable contact of the switch to closed position, a key operated device for releasing the spring and a device which permits unlocking the switch, but prevents complete movement of the switch to closed position, so long as the key is in the lock. Consequently when the key is removed the switch will be automatically moved by the spring to closed position.

A further object of the invention is to provide a combined switch and lock comprising separate unitary subassemblies, one of which includes an operating member and lock therefor and the other of which includes the complete switch. When these sub-assemblies are joined together, the operating member of the switch will be positioned for operation by the operating member of the controller.

A further object of the invention is to provide a unitary ignition coil, ignition circuit switch, controller for the switch and lock therefor including novel features such as mentioned in the foregoing paragraphs.

Further objects and advantages of the present invention will be apparent from the following description, reference being had to the accompanying drawing, wherein a preferred form of embodiment of the present invention is clearly shown.

Figure 5:
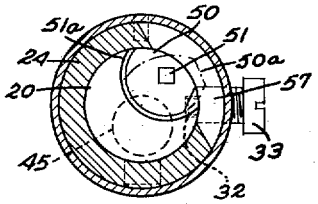
Figure 6:
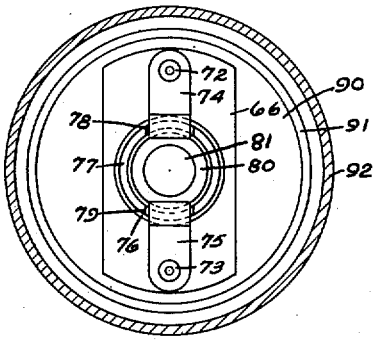
Figure 2:
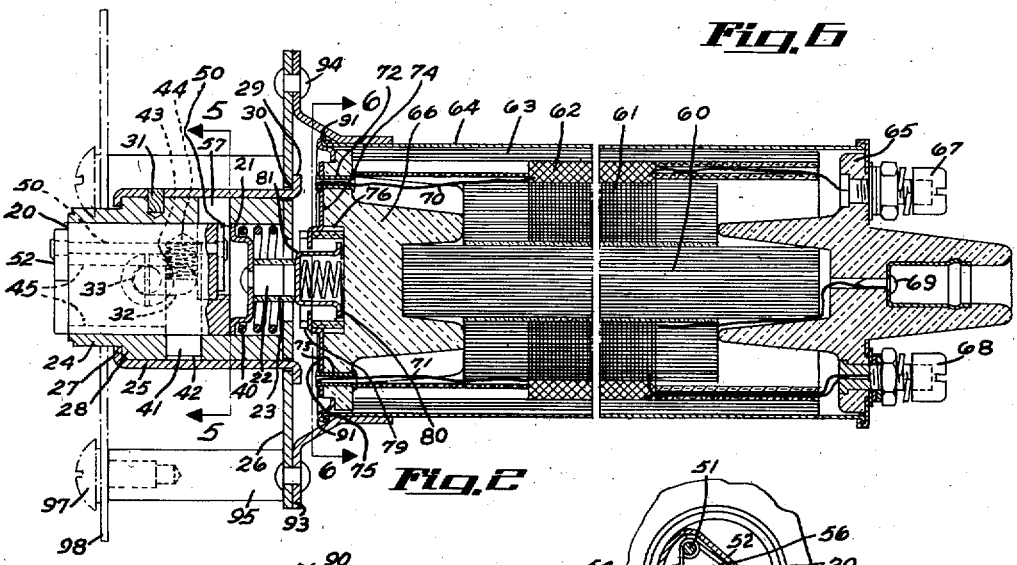
Fig. 2 is a longitudinal sectional view on the line 2—2 of Fig. 1.

Figs. 5 and 6 are sectional views taken respectively on the lines 5—5 and 6—6 of Fig. 2.

The controller and lock therefor which comprises one of the unitary sub-assemblies of the structure shown in the drawing will first be described. This controller includes an operating member comprising an endwise movable member 20, and a cupped disc 21 carrying a metal stud 22 surrounded by a non-conducting tube 23. As will appear more clearly hereinafter these parts 20 to 23 constitute the operating member of the controller although the member 20 might be referred to as the operating member, and the parts 22 and 23 collectively as means for transmitting motion from the operating member 20. The members 20 and 21 are slidable within a tubular guide or bearing 24 which together with a tubular outer jacket 25 and a plate 26 provides a case and support for the operating member and lock of the controller. The jacket 25 is provided with an inwardly extending flange 27 which engages a shoulder 28 of the guide 24, and with a plurality of tangs 29 which extend through holes 30 in the plate 26 and are bent over so as to secure the casing members 24, 25 and 26 in assembled relation. A screw pin 31 extends through the members 25 and 24 in order to prevent relative rotation between them. Rotation between members 20 and 24 is prevented by providing the member 20 with an elongated groove 32 which receives the inner end of a screw 33 which is threaded into a tapped hole extending through the side wall of the member 24.

Figure 3:
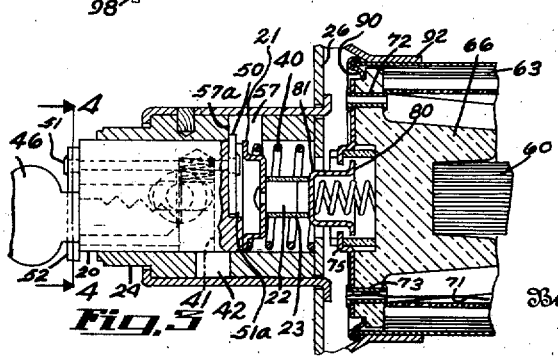
Fig. 3 is a view similar to Fig. 2 showing certain parts in positions differing from the positions shown in Fig. 2.

A spring 40 tends to move the operating member 20 toward the left or toward operating position as will appear more clearly hereinafter. The operating member 20 is locked in non-operating position shown in Fig. 2 by a bolt 41 which is adapted to enter a recess 42 in a side wall of the member 24. The bolt 41 is slidable within a recess 43 in the member 20 and is urged into locking position by a spring 44. The operating member 20 carries a rotatable key barrel or cylinder 45 which can be turned only by the proper key indicated at 46 in Fig. 3. The mechanism for causing the bolt 41 to be withdrawn from the recess 42 when the key cylinder 45 is rotated has been omitted as illustration thereof will be unnecessary to those skilled in the art. It will be understood, however, that the parts 20, 24, 41, 44 and 45 are comprised in what is known to the trade as the automobile type cylinder lock. It will be understood that when the cylinder 45 is rotated by the key the bolt 41 will be withdrawn from the recess 42 thereby releasing the spring 40 in order to cause the operating member 20 to be moved toward the left, until the right hand end of the groove 32 engages the inner end of the screw 33. After this movement has taken place the key 46 may be released to allow the spring 44 to move the bolt 41 against the interior surface of the casing member 24. Then the key 46 may be withdrawn. The operating member 20 may be moved toward the right into non-operating position and locked in said position without the use of a key. It will be apparent that when the operating member 20 has been moved so that the plunger 41 will be in alignment with the recess 42 the spring 44 will automatically move the plunger 41 into locking position.

Figure 1:
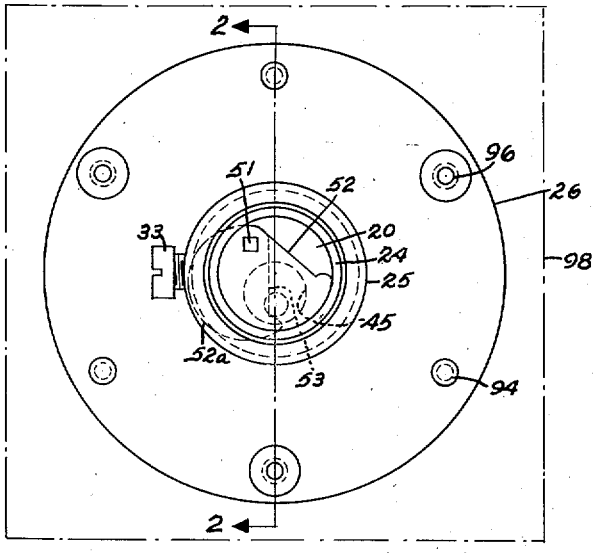
Fig. 1 is a front view of a unitary lock and switch constructed in accordance with the present invention, the rectangle drawn with dot-and-dash lines representing the instrument board to which the structure may be attached.
Figure 4:
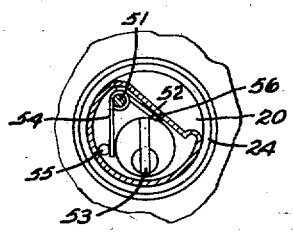
Fig. 4 is a sectional view on the line 4—4 of Fig. 3.

In order to compel the operation of the controller to remove the key before the operating member 20 can be moved fully to operating position, means operated by the key are provided for preventing the full movement of the operating member 20 toward the left or into operating position while permitting the bolt 41 to be withdrawn from the recess 42, and while permitting the operating member 20 to be moved a limited amount so that the locking bolt 41 will be held in unlocked position by engagement with the interior wall of the casing member 24. This key controlled device comprises a movable stop 50 which is located with a recess 51ª provided in the right end of the operating member 20. The stop 50 is attached to the squared end of the shaft 51 which extends through and is rotatably supported by the operating member 20. The left end or exposed end of the shaft 51 is also square and is attached to a cover 52 for the key hole 53 of the cylinder 45. The cover 52 is maintained in position covering the key hole 53 as shown in Figs. 1 and 4 and the stop 50 is maintained in position entirely within the periphery of the operating member 20 by a spring 54 having its intermediate portion coiled around the shaft 51, one end bearing against a pin 55 attached to member 20 and the other bearing against a side wall 56 of the cover 52. The spring 54 is biased so as to tend to move the cover 52 in a counterclockwise direction as viewed in Fig. 4 and the movement of the cover is limited by engagement with the stop 55. When the key 46 is inserted in the key operated member or cylinder 45 the cover 52 will be moved from the full line position shown in Fig. 1 to the position 52ª (indicated by dot-and-dash lines in Fig. 1) and the stop 50 will be moved from the full line position shown in Fig. 5 to the position 50ª (indicated by dot-and-dash lines in Fig. 5). Therefore, the inserting of the key 46 in the lock will cause the stop 50 to move into a recess 57 provided by cutting away a portion of the side wall of the casing member 24. The recess 57 is of such width relative to the thickness of the stop 50 as to permit movement of the operating member 20 from the position shown in Fig. 2 to that shown in Fig. 3, the cylinder 45 having been turned by the key 46 to withdraw the bolt 41 from the recess 42. Therefore, so long as the key 46 remains in the key cylinder 45 the operating member cannot move the full amount toward the left into operating position. When the key 46 is withdrawn the spring 54 will be released to return the cover 52 and the stop 50 to normal position as indicated in full lines in the drawing, thereby permitting the spring 40 to complete the movement of the operating member 20 toward the left or until the right hand end of the groove 32 engages the inner end of the screw 33.

While the controller may be used to operate various sorts of mechanism particularly for rendering some essential part of an automobile operative or inoperative, the form of control which has been illustrated is particularly adapted for controlling an electric switch which may be included alone or with an ignition coil in a unitary sub-assembly which is adapted to be attached to the plate 26 forming a part of the controller and lock sub-assembly.

The sub-assembly including the electric switch for an ignition coil will now be described. The ignition coil comprises a central magnetizable core 60 surrounded by secondary coil 61 and a primary coil 62. These coils are surrounded by an external magnetic circuit 63 and all of these parts are housed within a container which comprises a metal tube 64 attached to non-conducting end members 65 and 66. The member 65 carries terminals 67 and 68 connected with the ends of the primary coil 62, respectively. The terminal 68 is connected with the outside end of the secondary winding 61 and its inside end is connected with a terminal 69. One of the turns of the primary winding 62 is cut to provide leads 70 and 71 which extend through hollow rivets 72 and 73, respectively, and are attached to switch contacts 74 and 75, respectively. The rivets 72 and 73 secure said contacts 74 and 75 respectively, to the member 66. Member 66 is provided with a recess 76 for receiving a non-conducting tube 77 having diametrically opposite notches 78 and 79 for receiving, respectively, the inner ends of the switch contacts 74 and 75. The contacts 74 and 75 maintain the tube 77 within the recess 76; and, since the inner ends of these contacts fit somewhat snugly within the notches 78 and 79, rotation of the contacts 74 and 75 with respect to their attaching rivets 72 and 73, respectively, is prevented.

The stationary contacts 74 and 75 are adapted to be engaged by the outwardly extending flange 80 of a metallic, cup-shaped switch operating member 81 which is located within the tube 77. A spring 82 tends to urge the contact operating member 81 outwardly with respect to the recess 76 and its flange 80 into engagement with the contacts 74 and 75. It is therefore apparent that these contacts will maintain the contact actuator 81 within the tube 77.

The non-conducting end member 66 is supported by a metallic coil housing end member 90 which is attached at 91 to the coil housing tube 64 and which is provided with an aperture through which a portion of the non-conducting member 66 extends as shown in Figs. 2 and 6. A case or support for the switch is provided by the member 66 and 90 and by a flanged tubular member or collar 92 which is permanently secured to the metal coil housing tube 64. The collar 92 has an outwardly extending flange 93 which is adapted to be secured to the plate 26 by rivets 94 and rivet studs 95. It is therefore apparent that the parts 66, 90, 92 and 26 will provide a housing for the switch.

Like the controller and lock, the ignition coil and switch may be constructed as a separate sub-assembly. When the controller and lock sub-assembly is united to the switch sub-assembly, the operating member of the controller will operatively engage the switch contact operating member. These sub-assemblies may be readily disassembled by shearing off the riveted portions in case repairs or displacements of either sub-assembly are desired.

The studs 95 are provided with tapped holes 96 for receiving screws 97 by which the structure may be attached to the back of an instrument board 98.

The operation of the controller with respect to the switch will now be described. When the controller is in locked position as shown in Fig. 2, the switch contact flange 80 is separated from the contacts 74 and 75, thereby breaking the circuit of the primary winding of the ignition coil. The flange 80 is spaced from the end wall of the recess 76 so as to permit complete movement of the operating member 20 to locking position while at the same time allowing for variations in manufacture. When the key 46 is inserted in the cylinder 45 and turned to withdraw the bolt 41 from the recess 42, the operating member 20 will be automatically moved by the spring 40 into the position shown in Fig. 3 wherein the locking bolt 41 is held in retracted position. Due to the engagement of the stop 50 with the wall 57[a] defining the recess 57, movement of the operating member 20 is arrested and hence the contact flange 80 cannot engage the switch contacts 74 and 75 while the key remains in the lock. This feature compels the car driver to withdraw the key from the lock in order to start the engine of the automobile. When this is done the stop 50 will automatically move away from the recess 57 as already described and the spring 40 will be released to move the operating member 20 further toward the left so that the spring 82 may move the contact flange 80 into engagement with the contacts 74 and 75. When the operating member 20 has completed its full movement toward the left, and when the contact flange 80 has engaged the contacts 74 and 75 there will be a slight space between the right hand end of the non-conducting tube 23 and the left hand end of the contact actuator 81. In this way the closing of the switch is assured although there may be some slight variations in manufacture.

To open the switch the operator has but to push in the operating member 20 until the bolt 41 is in alignment with the recess 42 whereupon the spring 44 will be released to maintain the operating member in non-operating position and the switch in open position.

One of the principal advantages of the present invention is that the operator is required to remove the key from the lock before the controller can be moved to operating position to render operative some essential part of the automobile such as the ignition apparatus. Another feature is that the controller may be moved and locked in non-operating position or the ignition switch in open position without the use of a key. As a result of these features the likelihood of a car driver leaving the key in the lock when leaving the car has been substantially eliminated. Another feature of the invention is that the controller is automatically moved to operating position to permit movement of the switch to on position when the key is removed from the lock. No further manipulation by the operator is required to render the ignition apparatus operative.

While the form of embodiment of the present invention as herein disclosed, constitutes a preferred form, it is to be understood that other forms might be adopted, all coming within the scope of the claims which follow.

What is claimed is as follows:

1. A coil and circuit controller therefor comprising, in combination, a unitary sub-assembly including an operating member, a lock therefor, and a support for the operating member and lock and including a mounting plate; a unitary sub-assembly including an ignition coil having a cylindrical housing and an ignition switch mounted on one of the coil housing end walls and having an operating member, and a collar attached to the coil cylindrical housing and extending beyond the end wall carrying the switch; and means for securing the collar to said plate, said plate and collar being adapted to provide a housing for the switch, and to locate the first mentioned operating member in operative relation to the switch operating member.

2. A coil and circuit controller therefor comprising, in combination, a housing for the coil, a switch supported entirely by the housing upon the exterior of a wall thereof, and including a movable member; a key operated controller and supporting frame therefor independent of the coil housing; and means for securing the coil housing and controller frame together in such manner that the controller may operatively engage the switch movable member.

3. A coil and circuit controller therefor comprising, in combination, a housing for the coil, a switch mounted wholly upon the exterior of a wall of the coil and having a member movable longitudinally of the coil; a key operated controller movable longitudinally, a frame wholly supporting the controller; and means for securing the housing and frame together in such a manner that the controller may impart longitudinal movement to the switch movable member.

4. A coil and circuit controller therefor comprising, in combination, a housing for the coil including a tubular side wall and a non-conducting end wall, a switch supported entirely upon the exterior of said end wall and including a movable contact, a key operated controller movable longitudinally of the coil, a frame wholly supporting the controller, and means for securing the frame and housing together in such manner that the controller will engage the switch movable member.

5. Apparatus according to claim 4, in which the coil housing end wall has a recess for receiving the movable contact which is urged by a spring within the recess toward a stationary contact extending adjacent the recess.

6. Apparatus according to claim 4 in which the coil housing end wall has a recess for receiving a cup-shaped movable contact which receives one end of a coil spring bearing against the end wall of the recess for the purpose of urging the movable contact toward stationary contacts extending into the recess and engageable with an external annular flange provided by the movable contact.

7. A coil-switch unit comprising, in combination, a tubular housing of relatively thin sheet metal, an ignition coil within the housing, an end wall member for the housing, a switch including movable and stationary contacts, the stationary contact being insulatingly carried by the end wall member and electrically connected with the coil, a tubular member surrounding and attached to the housing and projecting from the housing axially beyond the end wall member to provide a switch enclosure, a plate attached to a marginal portion of the tubular member to provide a switch case closure, and a controller supported by the plate for operating the movable contact.

8. A coil-switch unit comprising, in combination, a tubular housing of relatively thin sheet metal, an ignition coil within the housing, an end wall member for the housing, a switch including movable and stationary contacts, the stationary contact being insulatingly carried by the end wall member and electrically connected with the coil, a tubular member surrounding and attached to the housing and projecting from the housing axially beyond the end wall member to provide a switch enclosure, a flat plate attached to a marginal portion of the tubular member to provide a switch case closure, a bearing member secured to the plate, a key operated cylinder movable in said bearing member, and means for transmitting motion from the cylinder to the movable switch contact.

9. A coil-switch unit comprising, in combination, a unitary sub-assembly comprising a tubular housing, a coil within the housing, an end wall member for the housing, a switch contact insulatingly fixed to the end wall member, and a tubular body surrounding and fixed to the coil housing and extending beyond the end wall member of the housing; a unitary sub-assembly including a member adapted to be fixed to the tubular body, and a switch controller; a movable contact connected with the controller; and means for fixing the member carrying the controller to the tubular body whereby said controller-carrying-member, tubular body and end wall member enclose the switch contacts.

10. A coil switch unit comprising, in combination, a unitary sub-assembly comprising a tubular housing formed of relatively thin sheet metal, an ignition coil within the housing, an end wall member for the housing, a switch contact insulatingly carried by the end wall member, and a relatively thick metallic tubular body surrounding and fixed to the coil housing; a unitary sub-assembly including a member adapted to be fixed to the tubular body, a cylindrical bearing attached to the member, and a key receiving plug carried in said bearing; a movable contact connected with the plug; and means for fixing the member carrying the bearing to the tubular body whereby the bearing-carrying-member, tubular body and end wall member enclose the switch contacts.

11. A coil-switch unit comprising, in combination, a housing including a tubular part and an end wall, a coil located within the housing, a switch comprising a stationary contact connected with the coil and insulatingly carried by the end wall and a movable contact cooperating with the stationary contact, a switch case including said housing end wall and two members one of which partially encloses the switch and also surrounds the coil housing and is attached directly thereto, means for securing an edge portion of one member to an edge portion of the other member, and a controller connected with the movable contact and carried by the switch case member not directly attached to the coil housing.

12. A coil-switch unit comprising, in combination, a tubular housing, an ignition coil within the housing, an end wall secured directly to the housing and supporting a part of the coil, a switch including movable and stationary contacts, the stationary contact being insulatingly carried by the end wall member and electrically connected with the coil, a tubular member surrounding and attached to the housing and projecting from the housing axially beyond the end wall member to provide a switch enclosure, a plate attached to the marginal portion of the tubular member to provide a switch case closure, and a controller supported by the plate for operating the movable contact.

13. A coil-switch unit comprising, in combination, a unitary sub-assembly comprising a tubular housing of relatively thin sheet material, an ignition coil within the housing, an end wall secured directly to the housing and supporting a part of the coil, a switch contact insulatingly supported by the end wall and connected with the coil, and a relatively thick metallic tubular member surrounding and attached to the housing and projecting from the housing axially beyond the end wall member to provide a switch enclosure; a second unitary sub-assembly comprising a plate adapted to be fixed to the tubular member and a controller carried thereby; a movable contact actuated by the controller; and means for securing the plate to the tubular member.

14. A coil-switch unit comprising, in combination, a tubular housing, an ignition coil within the housing, an end wall member secured to the housing, a stationary contact insulatingly carried by the end wall member and connected with the coil, a tubular member surrounding and attached to the housing and projecting from the housing axially beyond the end wall member to provide a switch enclosure, a plate attached to the marginal portion of the tubular member to provide a switch case closure, a controller carried by said plate, and a movable contact guided for movement by the housing end wall member and actuated by said controller.

15. A coil switch unit comprising, in combination, a tubular housing formed of relatively thin sheet material, an ignition coil within the housing, a housing end wall including a non-conducting member supporting a part of the coil, a stationary contact carried by said non-conducting member, a relatively thick, metallic, tubular member surrounding and attached to the housing and projecting from the housing axially beyond the end wall member to provide a switch enclosure, a plate attached to the marginal portion of the tubular member to provide a switch case closure, a controller carried by said plate, and a movable contact guided for movement by the housing end wall member and actuated by said controller.

In testimony whereby the DELCO-REMY CORPORATON hereby affixed its hand and seal by its fully authorized officers.

[L. S.] DELCO-REMY CORPORATION,
*Assignee of Harry E. Norviel, Deceased,*
By F. C. KROEGER,
*President.*

Attest:
B. D. COOPER,
*Assistant Secretary.*